United States Patent
Crawford et al.

(10) Patent No.: US 10,248,015 B2
(45) Date of Patent: Apr. 2, 2019

(54) DYNAMIC BLACKBODY SCENE DISPLAY

(71) Applicant: Raytheon Company, Waltham, MA (US)

(72) Inventors: John O. Crawford, Vail, AZ (US); Delmar L. Barker, Tucson, AZ (US)

(73) Assignee: RAYTHEON COMPANY, Waltham, MA (US)

( * ) Notice: Subject to any disclaimer, the term of this patent is extended or adjusted under 35 U.S.C. 154(b) by 153 days.

(21) Appl. No.: 15/388,708

(22) Filed: Dec. 22, 2016

(65) Prior Publication Data

US 2018/0180981 A1   Jun. 28, 2018

(51) Int. Cl.
| G01J 5/04 | (2006.01) |
| G02B 5/20 | (2006.01) |
| G03B 21/60 | (2014.01) |
| H04N 9/31 | (2006.01) |
| G01J 5/52 | (2006.01) |
| H04N 17/00 | (2006.01) |
| B82Y 20/00 | (2011.01) |

(52) U.S. Cl.
CPC ............ *G03B 21/60* (2013.01); *G01J 5/046* (2013.01); *G01J 5/522* (2013.01); *G02B 5/208* (2013.01); *H04N 9/3155* (2013.01); *H04N 9/3194* (2013.01); *H04N 17/002* (2013.01); *B82Y 20/00* (2013.01); *Y10S 977/742* (2013.01)

(58) Field of Classification Search
CPC ..................................................... G03B 21/60
USPC ..................................................... 250/495.1
See application file for complete search history.

(56) References Cited

U.S. PATENT DOCUMENTS

| 7,238,957 | B2 | 7/2007 | Bailey et al. |
| 7,777,207 | B2 | 8/2010 | Bailey |
| 8,552,381 | B2 | 10/2013 | Fainchtein et al. |
| 8,830,453 | B2 | 9/2014 | Zhu et al. |

(Continued)

FOREIGN PATENT DOCUMENTS

| WO | 2004068851 A1 | 8/2004 |
| WO | 2016081293 A1 | 5/2016 |

OTHER PUBLICATIONS

Bao, et al.; "Optical Properties of Ordered Vertical Arrays of Multi-Walled Carbon Nanotubes from FDTD Simulations"; 2010; vol. 18, No. 6.; Optics Express; Optical Society of America; 13 pages.

(Continued)

*Primary Examiner* — David P Porta
*Assistant Examiner* — Jeremy S Valentiner
(74) *Attorney, Agent, or Firm* — Cantor Colburn LLP

(57) ABSTRACT

An apparatus for displaying a scene with blackbody light includes a sheet of nano-structures having a first side and a second side opposing the first side. The first side and the second side are configured to receive light from an environment facing both sides and emit light to the environment facing both sides. Each nano-structure is configured to receive light in a first range of wavelengths resulting in heating the nano-structure and to emit blackbody light due to the heating to display the scene with blackbody light. The apparatus also includes a projector configured to irradiate the nano-structures on one of the sides of the sheet with light in the first range of wavelengths that form the scene to be displayed with the blackbody light emitted from the sheet of nano-structures.

15 Claims, 4 Drawing Sheets

(56) References Cited

U.S. PATENT DOCUMENTS

| | | | |
|---|---|---|---|
| 9,241,115 B2 | 1/2016 | Owens et al. | |
| 2007/0103048 A1 | 5/2007 | Liu et al. | |
| 2008/0152901 A1* | 6/2008 | Ting | B82Y 20/00 |
| | | | 428/328 |
| 2008/0157652 A1 | 7/2008 | Li et al. | |
| 2010/0108916 A1* | 5/2010 | Barker | G01J 3/10 |
| | | | 250/495.1 |
| 2010/0110308 A1 | 5/2010 | Nicholson et al. | |
| 2013/0048884 A1* | 2/2013 | Fainchtein | H04N 5/33 |
| | | | 250/495.1 |
| 2013/0329220 A1* | 12/2013 | Jiang | G01J 1/02 |
| | | | 356/213 |
| 2013/0341535 A1* | 12/2013 | Owens | H04N 5/33 |
| | | | 250/495.1 |

OTHER PUBLICATIONS

Carbon Nanotube Black Body, nano tech 2009, (2009) [retrieved on Jun. 26, 2012 (Jun. 26, 2012)]. p. 13. Retrieved from the internet:,URL:http://www.aist.go.jp/aist_e/search/aist_google_search_e.html?cx=004983608496508821980%3Aavdsyoeo0bu&cof=FORID%3A10&i.

Zhang, et al. "Strong Transparent, Multifunctional, Carbon Nanotube Sheets" Science, vol. 309, Aug. 19, 2005. pp. 1215-1219.

Deep, et al.; "Carbon Namomaterials for Electronics, Optoelectronics, Photovoltaics, and Sensing"; Chemical Society Reviews; vol. 42, No. 7; Nov. 5, 2012; 38 pages.

Notification of Transmittal of the International Search Report and the Written Opinion of the International Searching Authority, or the Declaration; PCT/US2017/064860; dated Jul. 23, 2018; 20 pages.

* cited by examiner

DYNAMIC BLACKBODY SCENE DISPLAY

BACKGROUND

The present disclosure relates generally to displays and, more particularly, to displays generating scenes with electromagnetic radiation in a range of infrared wavelengths. In general, the scenes may be displayed at any selected wavelength, but for teaching purposes the scenes may be discussed as being displayed in a range of infrared wavelengths, which can be useful for certain applications.

Infrared imagining sensors form an image of received light from energy received in a range of infrared wavelengths, as do imaging sensors at other wavelengths. This image may be translated to the visible light spectrum for observation by a human observer, or the invisible wavelengths may be processed directly and actions taken based on this processing without human intervention or human viewing of the image. Calibration and testing of such imaging sensors is advantageously performed using synthesized imagery or scenes in real time in the waveband of the sensor. Typically, these images or scenes dynamically depict movement, thus requiring rapid imaging of many consecutive still scenes to depict the movement. In general, increasing the rate of acquisition of test imagery by the imaging sensor will increase the precision, stability, accuracy, and speed with which the sensor may be tested or calibrated. For example, at infrared wavelengths, an infrared scene synthesizer or display may accordingly be required to display scenes or images in a range of infrared wavelengths at a refresh rate that is compatible with the image acquisition rate of the infrared imaging sensor.

Generating infrared scenes depicting movement using conventional techniques has proven to be challenging. A typical manner of providing such scenes involves heating and cooling resistive elements in an array to provide infrared irradiance. Unfortunately, the thermal inertia of these elements limits the rate at which the scene can be refreshed and often results in artifacts in the scene. Further, resistive elements with pixel counts sufficient to match pixel counts of modern imaging devices are difficult and expensive to fabricate, and require large amounts of power. In addition, the resistive elements typically do not produce true blackbody spectra. The limited refresh rate, spectral inaccuracy, and artifact introduction can consequently interfere with calibration and testing. Hence, improvements in devices for displaying infrared dynamic scenes would be well appreciated in the infrared imaging sensor industry.

SUMMARY

Disclosed is an apparatus for displaying a scene with blackbody light. The apparatus includes: a sheet of nano-structures having a first side and a second side opposing the first side, the first side being configured to receive light from an environment facing the first side and the second side and emit light to the environment facing the first side and the second side, the second side being configured to receive light from an environment facing the first side and the second side and emit light to the environment facing the first side and the second side, wherein each nano-structure is configured to receive light in a first range of wavelengths resulting in heating the nano-structure and to emit blackbody light due to the heating to display the scene with blackbody light; and a projector configured to irradiate the nano-structures on one of the sides with light in the first range of wavelengths that form the scene to be displayed with the blackbody light emitted from the sheet of nano-structures.

Also disclosed is a method for displaying a scene with blackbody light. The method includes: irradiating nano-structures in a sheet of nano-structures using a projector configured to irradiate the nano-structures with light in a first range of wavelengths to project the scene, the sheet of nano-structures comprising a first side and a second side opposing the first side, the first side being configured to receive light from an environment facing the first side and the second side and emit light to the environment facing the first side and the second side, the second side being configured to receive light from an environment facing the first side and the second side and emit light to the environment facing the first side and the second side, wherein each nano-structure is configured to receive light in a first range of wavelengths resulting in heating the nano-structure and to emit blackbody light due to the heating to display the scene with blackbody light; heating each of the nano-structures in response to the irradiating; and emitting blackbody light from each nano-structure due to the heating to display the scene with the blackbody light.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

A detailed description of one or more embodiments of the disclosed apparatus and method is presented herein by way of exemplification and not limitation with reference to the Figures.

Disclosed are embodiments of apparatus and method for displaying a known infrared image or moving scene. The infrared image or moving scene may be displayed to an infrared imager for calibrating or testing the infrared imager or a processor configured to process the obtained image for various purposes.

Figure 1:
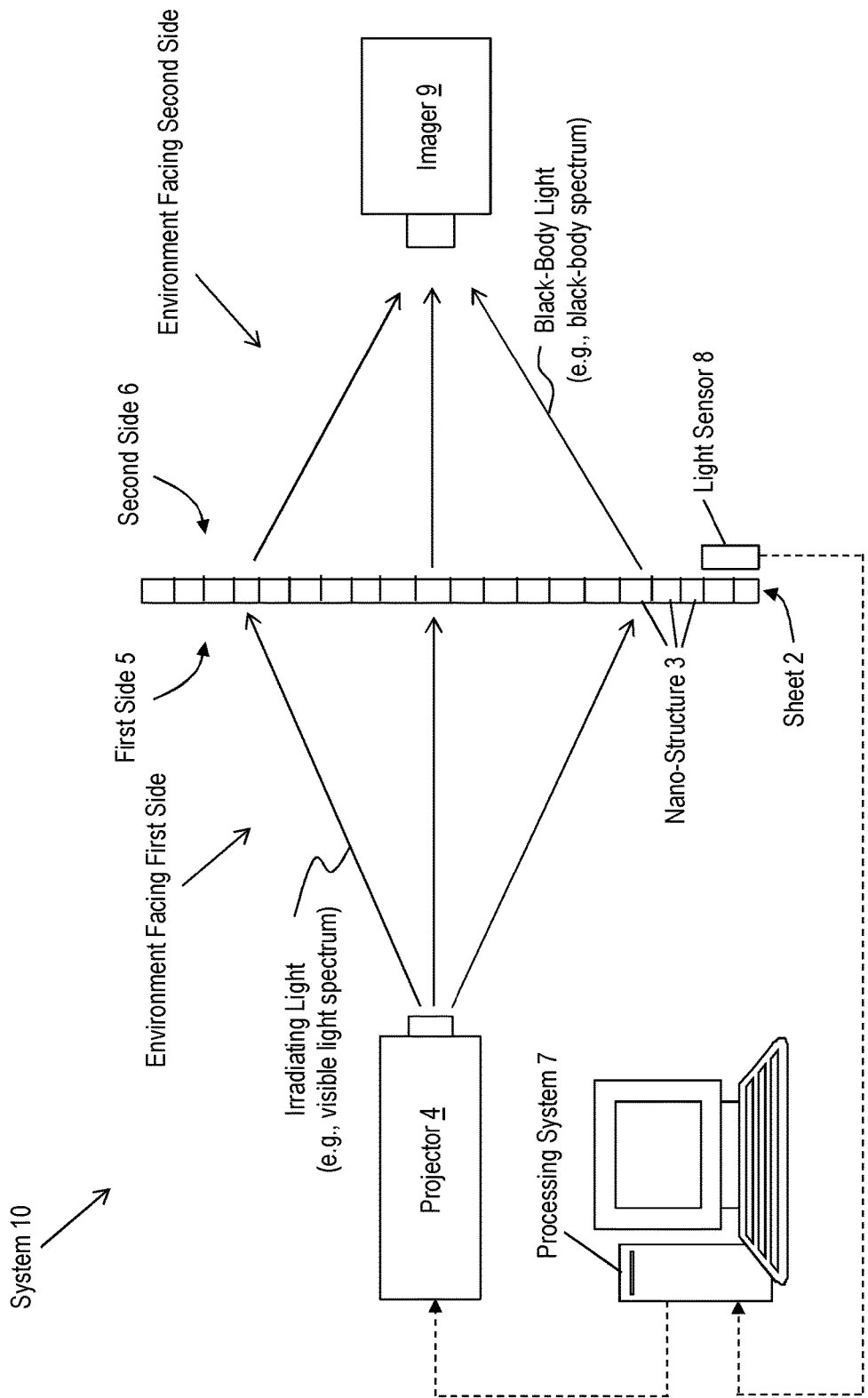
FIG. 1 is an embodiment of a display system for generating dynamic scenes in a range of infrared wavelengths.

FIG. 1 illustrates a cross-sectional view of an embodiment of a system 10 for displaying a scene with blackbody light that is generally in a range of infrared wavelengths. The system 10 includes a sheet 2 having a plurality of nano-structures 3. The nano-structures 3 have dimensions on the order of nano-meters. Each of the nano-structures 3 is configured to be heated and consequently emit light due to blackbody radiation in response to the heating. The blackbody radiation referred to as blackbody light herein has an intensity versus wavelength distribution according to the Planck Spectrum for the temperature of the nano-structures 3, each of which are considered a blackbody (i.e., a body with a spectral emission profile matching the Plank spectrum). Hence, curves of spectral radiance versus wavelengths are available for specific temperatures of the black body. In one or more non-limiting embodiments, the nano-structures 3 are carbon nano-tubes. Other nano-shapes may also be used. In one or more non-limiting embodiments, the nano-structures 3 are made of carbon, graphene, sandwiched layers of carbon, Rebar Graphene, pillared Graphene and/or Fullerenes. These structures may absorb radiation and re-radiate it locally, heating the nano structures in ensemble, or may re-radiate individually, or a combination, but whatever radiation is absorbed, substantially all radiation is re-radiated. Other types of materials that are non-reflective and can also be heated quickly due to low mass and consequently emit blackbody light may also be used. The term "quickly" relates to being heated and cooled off in a small enough time interval to enable display of a series of scenes that depict motion according to a selected frame rate. This implies that nearby spots of differing temperature do not affect one another over the timeframe in which scenes are read.

Still referring to FIG. 1, the system 10 includes a projector 4 configured to irradiate the sheet 2 of nano-structures 3 with light that forms an image of a scene. The scene can be a static image or a series of images that projects a moving scene. For teaching purposes, the sheet 2 is labeled having a first side 5 and a second side 6. The scene is projected on the first side 5. The image of the scene in blackbody wavelengths can be displayed on the first side 5 and/or the second side 6. Non-limiting embodiments of the projector 4 include a digital light processing (DLP) projector and/or a scanning laser. The projector 4 may be configured to irradiate the nano-structures 3 in a continuous analog manner and/or in a digital manner in which the nano-structures 3 are designated into unique groups that are treated as pixels. The projector 4 may include or be coupled to a processing system 7. The processing system 7 may include media to store one or more scenes to be projected by the projector 4. The processing system 7 may, in combination with the projector 4, be configured to irradiate the nano-structures 3 according to an algorithm which can direct irradiation of the nano-structures 3 at a selected wavelength and/or intensity so that they can be at a desired temperature in order for the displayed blackbody light to be at one or more desired wavelengths in accordance with the Planck Spectrum. In one or more embodiments, the processing system 7 may form the controlling element of closed loop control system, which in combination with the light sensor 8, and the imager 9, provides an image that is spectrally and spatially controlled to provide the desired spatial, spectral, and temporal test image to the imager 9 which is undergoing test and alignment. Further, this processing system 7 may automatically determine calibration values, for example for gain control, spatial alignment, and dark current offset, which may be loaded, again automatically, to the imager 9, undergoing alignment and calibration. In one or more embodiments, the irradiating light emitted by the projector 4 is in a visible light spectrum and the blackbody light emitted by the sheet 2 of nano-structures 3 is in a range of infrared wavelengths.

It can be appreciated that the small mass (and therefore small thermal mass) of the nano-structures 3 allows very rapid heating and cooling. Heat and cooling cycles may be up to at least $10^4$ Hz, thus allowing rapid infrared scene generation rates (i.e., formation of rapidly changing infrared images) of up to at least $10^4$ Hz. The term "rapid" relates to infrared scene generation rates and heating/cooling cycle times of up to at least $10^4$ Hz. The rapid cycle time along with a true Planck Spectrum provides for generating dynamic scenes having high fidelity (i.e., accurately depicting movement requiring rapid infrared scene generation) to enable accurate calibration and testing of imaging or tracking equipment. In one or more embodiments, the sheet 2 has a thickness of approximately 50 nanometers, although the sheet can be thicker or thinner depending on a required radiation cooling rate and the type of nano material used. Thinner sheets have less mass and, therefore, have a higher radiation cooling rate than thicker sheets of the same density having a higher mass. The frequency at which the displayed scene can be updated depends of the radiation cooling rate where the higher radiation cooling rate enables a higher scene update frequency. Hence, the thickness of the sheet and thus the related mass of the sheet are selected to provide a desired scene or image update or refresh frequency.

It can also be appreciated that the sheet 2 of nano-structures 3 can provide a wide dynamic range of wavelengths. The nano-structures 3 can be heated to a wide range of temperatures and emit infrared light according to the Planck Spectra corresponding to those temperatures. For example, the nanotubes can be heated from 300° K to 1300° K in air, to 2500° K in Argon, and even higher in a vacuum.

Still referring to FIG. 1, the system 10 may include an imager 9 configured to image the scene displayed by the blackbody light emitted by the sheet 2 of nano-structures 3. The displayed scene may be recorded and/or processed further such as in a tracking system (not shown). The imager 9 may be dispose on the second side 6 of the sheet 2 as illustrated in FIG. 1 and/or the imager 9 may be disposed on the first side 5 of the sheet 2. The imager 9 may be an article that detects optical radiation at one or more wavelengths undergoing tests for co-alignment, calibration, signal radiometry or similar common sensor system tests.

Still referring to FIG. 1, the system 10 may include a light sensor 8 configured to sense an intensity and or a wavelength of received light. The light sensor 8 is optically coupled to at least some of the nano-structures 3 in order to sense the blackbody light emitted by those nano-structures 3. The light sensor 8 may provide a feedback signal to the projector 4 or processing system 7 so that the projector 4 can irradiate the nano-structures 3 with light at an intensity that provides for emitting the blackbody light at a desired wavelength or range of wavelengths. In one or more embodiments, the wavelength or range of wavelengths are skewed, by the addition of appropriate absorptive filters, so that the emitted blackbody light mimics absorption of wavelengths over an optical path that is to be simulated. In one or more embodiments, the optical path to be simulated is in an outdoor environment where the atmosphere may absorb some wavelengths of light as the light travels through the atmosphere. Light sensor 8 may be an imaging camera that views all or a portion of the nano structures 3 for the purposes of providing an integrated, self-calibrating or self-aligning means for the system 10.

Figure 2:
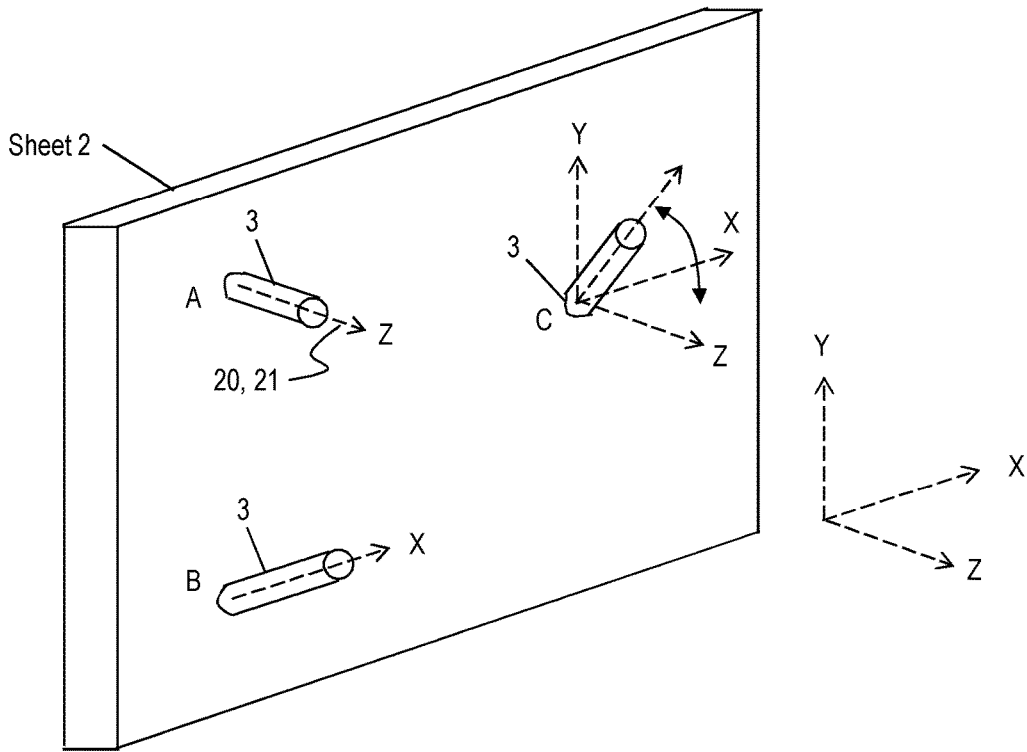
FIG. 2 depicts aspects of a sheet of nano-structures, which may be a "forest" of nano-tubes "grown" on a substrate, or a layer of nano-tubes deposited in some other way.

FIG. 2 depicts aspects of the nano-structures 3 in the sheet 2. The nano-structures 3 may be characterized by a longitudinal axis 20 such as an axis traversing the hollow center of a nano-tube or a centerline axis 21 for shapes not having a predominant longitudinal dimension. In one or more embodiments, each of the nano-structures 3 has the longitudinal axis 20 or centerline axis 21 and the sheet 2 has the nano-structures 3 with: (1) substantially parallel longitudinal axes or centerline axes and the longitudinal axes or centerline axes that are substantially perpendicular to a plane of the sheet (see A); (2) substantially parallel longitudinal axes or centerline axes and the longitudinal axes or centerline axes are parallel to the plane of the sheet (see B); (3) longitudinal axes or centerline axes at a selected angle to the plane of the sheet (see C); and/or (4) longitudinal axes or centerline axes at various angles to the plane of the sheet. Further, all or a portion of a sheet may be in any combination of orientations for the purpose of providing a spatial pattern or an array of spatial patterns of sheet areas with different properties. Axial orientations, or mixes of orientations may provide, for example, different depth or orientations of polarization or blackbody intensity as required for different test or calibration purposes. A selected polarization can be obtained by the orientation of the nano-structures. The idea is that the direction and uniformity of nano-structure orientation controls the direction, magnitude, and extent ('purity') of the polarization of the emitted light. A nano-structure sheet with 'pulled' fibers all going one way, will transmit only the portion of incoming light polarized along the 'pull' direction, so that the emitted light is polarized with the E vector of the emitted light along the length of the nanotube. Random orientation will result in a randomly polarized (i.e. un-polarized) image. Specific crossing orientations will result in an output with several simultaneous discrete polarizations.

Figure 3:
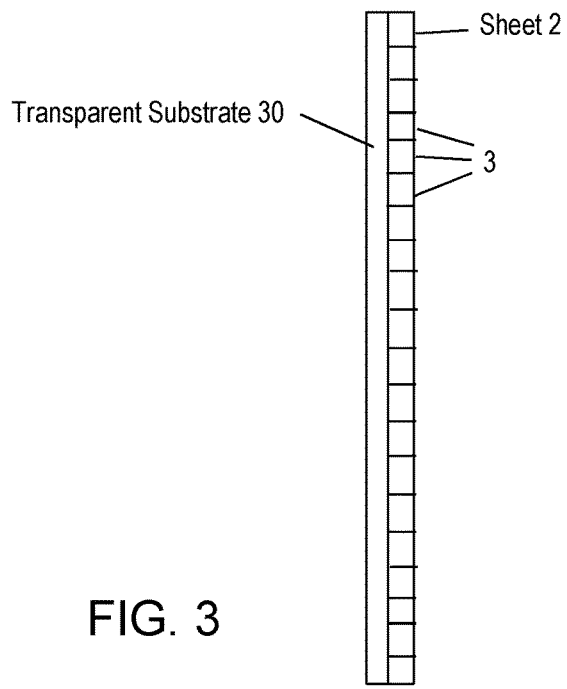
FIG. 3 depicts aspects of the sheet of nano-structures coupled to a transparent substrate, for example a "forest" of nano-tubes "grown" directly on the substrate and perpendicular to the substrate.

FIG. 3 depicts aspects of the sheet 2 of nano-structures 3 coupled to a transparent substrate 30. The substrate 30 may be on the first side 5 and/or the second side 6 of the sheet 2. In one or more embodiments when coupled to the second side 6, the sheet 2 may be configured to be opaque to the wavelengths of the blackbody light in order to prevent any blackbody light from leaking to the second side 6 (i.e., output or display side). In one or more embodiments, the substrate 30 is coupled to the sheet 2 by growing the nano-structures 3 on the substrate 30. In one or more non-limiting embodiments, the nano-structures may be "grown" on sapphire or silicon dioxide that are transparent to visible wavelengths, ultraviolet wavelengths, and infrared wavelengths.

Figure 4:
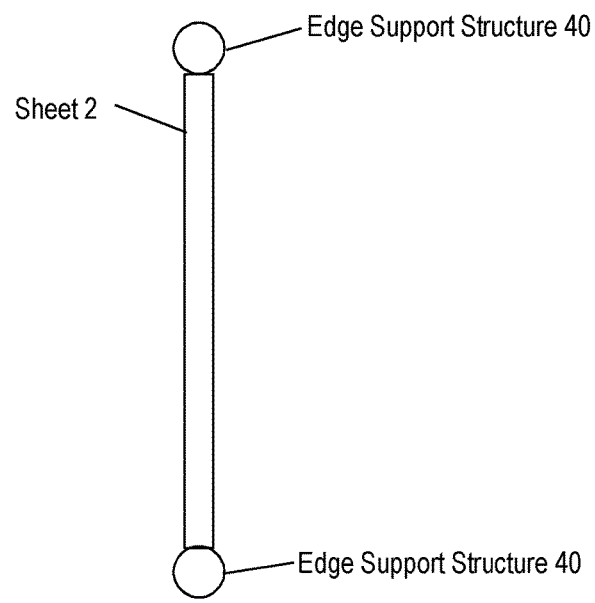
FIG. 4 depicts aspects of a side support structure for the sheet of nano-structures.

FIG. 4 depicts aspects of an edge support structure 40 configured to support the sheet 2 of nano-structures 3. The edge support structure 40 may be coupled to one edge of the sheet 2 and optionally on an opposing edge. In one or more embodiments, the edge support structure 40 may be a rod or beam having sufficient strength to support the sheet 2. The edge support structure 40 may be attached vertically or horizontally to the sheet 2. In these embodiments, the sheet 2 has sufficient stiffness so that the sheet 2 remains planar. In one or more embodiments, the thickness of the sheet 2 of nano-structures may be selected to achieve a desired amount of stiffness for a specific application.

Figure 5:
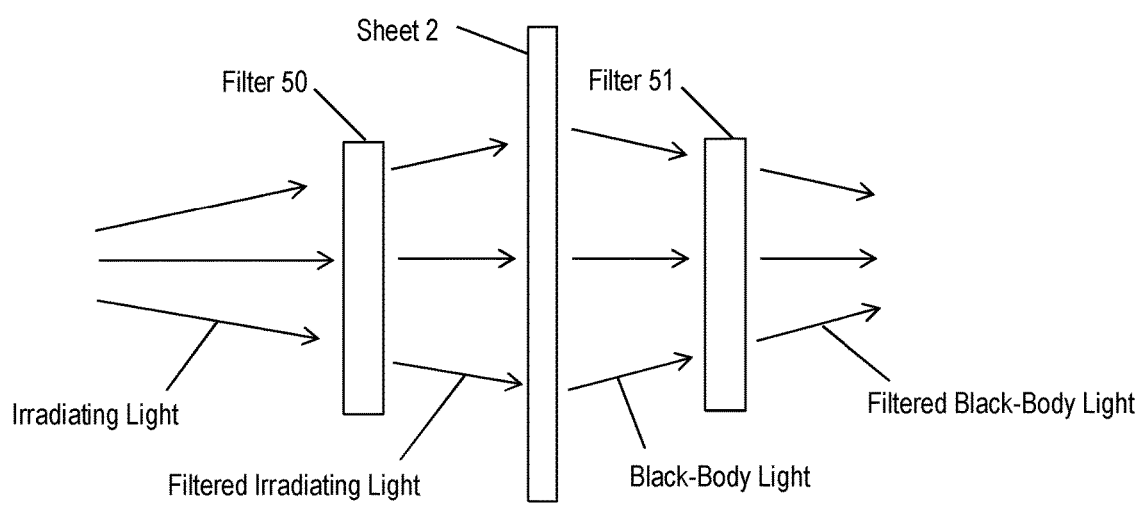
FIG. 5 depicts aspects of the scene generation system having a filter for spectrally attenuating a selected range of wavelengths in order to simulate an environment with atmospheric absorption spectra over a range of wavelengths.

FIG. 5 depicts aspects of the display system 10 having a first filter 50 and/or a second filter 51, each configured to filter a selected range of wavelength in order to simulate an outdoor spectrum of wavelengths. The first filter 50 may be disposed on the irradiating side (i.e. the first side 5) of the sheet 2 while the second filter 51 may be disposed on the displaying side (i.e., the second side 6 in FIG. 5). Being disposed on the irradiating side, the first filter 50 is configured to filter wavelengths of visible irradiating light so that the nano-structures 3 are heated to a selected temperature to provide blackbody light in accordance with the Planck Spectrum that simulates absorption of wavelengths along an optical path to be simulated. Filters on the irradiating side serve to ensure the intended irradiation goals without application of excess irradiation which light may be difficult to adequately control. Such filters do not directly affect the shape of the spectral intensity versus wavelength of the sheet emissions. Being disposed on the displaying side, the second filter 51 is configured to filter wavelengths of the blackbody light that simulates absorption of wavelengths along an optical path to be simulated. In one or more embodiments, the optical path to be simulated is in an outdoor environment where the atmosphere may absorb some wavelengths of light as the light travels through the atmosphere. In one or more embodiments, the second filter 51 on the displaying side may be an atmospheric absorption filter configured to simulate atmospheres that contain varying amounts of carbon dioxide, carbon monoxide, and/or water for various latitudes and/or longitudes over the earth.

Figure 6:
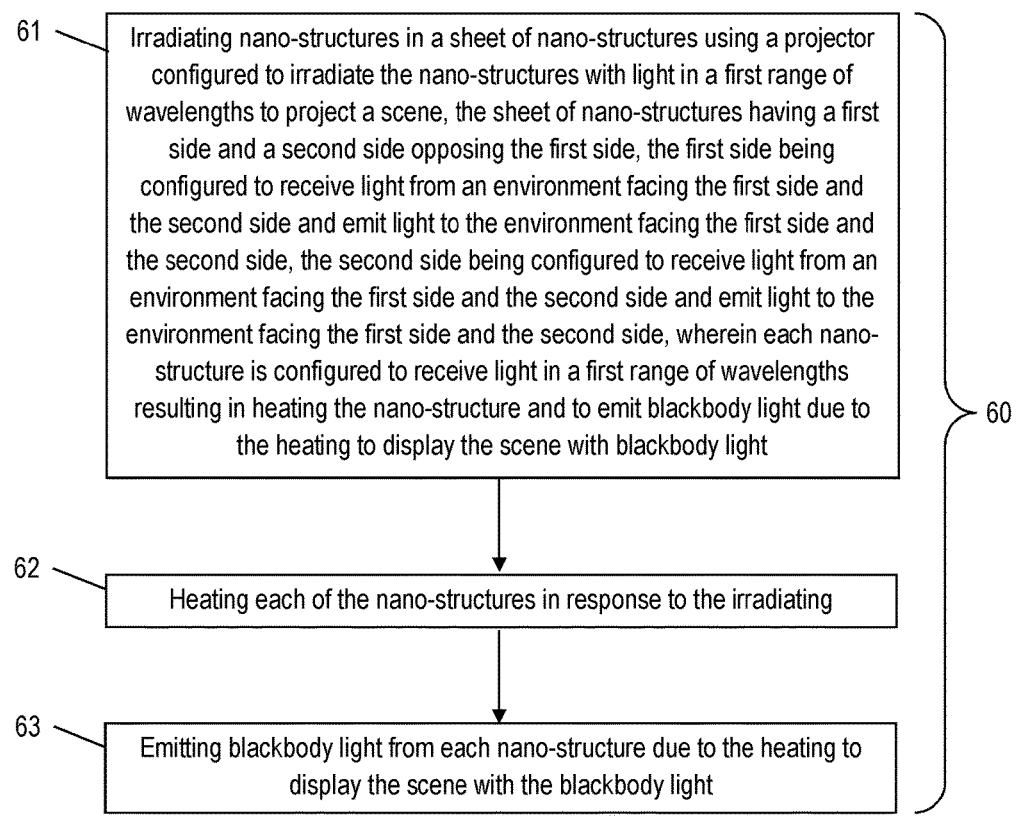
FIG. 6 is a flow chart of a method of generating a scene for display using black-body light.

FIG. 6 is a flow chart of a method 60 for displaying a scene with blackbody light. Block 61 calls for irradiating nano-structures in a sheet of nano-structures using a projector configured to irradiate the nano-structures with light in a first range of wavelengths to project the scene, the sheet of nano-structures having a first side and a second side opposing the first side, the first side being configured to receive light from an environment facing the first side and the second side and emit light to the environment facing the first side and the second side, the second side being configured to receive light from an environment facing the first side and the second side and emit light to the environment facing the first side and the second side, wherein each nano-structure is configured to receive light in a first range of wavelengths resulting in heating the nano-structure and to emit blackbody light due to the heating to display the scene with blackbody light. Block 62 calls for heating each of the nano-structures in response to the irradiating. Block 63 calls for emitting blackbody light from each nano-structure due to the heating to display the scene in blackbody light wavelengths. In one or more embodiments, the first range of wavelengths is in a visible range of wavelengths and the blackbody light is in a range of infrared wavelengths.

The method 60 may also call for supporting the sheet using a transparent substrate coupled to the sheet or a side support element that supports a side of the sheet.

The method 60 may also include imaging the scene using an imager that receives the emitted blackbody light. The imager may receive the blackbody light emitted from the first side of the sheet and/or the second side of the sheet.

The method 60 may also include sensing any combination of spectral intensity or spatial properties of the emitted black-body light using a light sensor in order to provide a feedback signal to the projector to irradiate the sheet of nano-structures with light that controls the emitted blackbody light so that the emitted blackbody light has a selected spectral intensity and/or spatial distribution.

The method 60 may also include irradiating the nano-structures in a continuous analog scheme and/or in a pixelated scheme in which unique groups of nano-structures are assigned to pixels and the displayed image is a pixelated image.

The method 60 may also include filtering the scene displayed with the black body light and blocking or reducing intensity of wavelengths of emitted light using a filter to mimic those absorbed in an environment that is to be simulated.

The method 60 may also include filtering the light irradiated by the projector to block or reduce intensity of wavelengths of that light such that the blackbody light emitted by the screen of nano-structures does not have or has reduced intensity at the wavelengths emitted from the nano-structures. Notably, there is no direct correspondence between the spectrum of the emitted light, which is essentially independent of the spectrum of the irradiating light, except to the extent the irradiated light is absorbed by the nano-structures, which results in heating, and light corresponding to the temperature of the resulting blackbody is emitted. This emitted light may subsequently be partially absorbed by a filter that is simulating intended scene temperatures, but the spectrum of the emitted light will not be directly affected by the filtration of the irradiated light, while its overall intensity may be so affected.

The method 60 may also include irradiating the nano-structures according to an algorithm that shifts a blackbody emissions shape as a function of temperature in order to provide sufficient unfiltered intensity such that it may be filtered by absorptive wavelength filters to produce blackbody light of the desired spectral intensity to match the light of the environment that is being simulated.

The sheet of nano-structures as disclosed herein provides several advantages. One advantage relates to the flexibility of being able to place a projector on any side of the sheet and to place a receiver on any side of the sheet. Another advantage is that multiple receivers can be used with at least one receiver on one side of the sheet and another receiver placed on the other side of the sheet. For example, in embodiments for aligning a tracking device for tracking blackbody light, the tracking device can be placed on the side opposite of the projector projecting a scene in visible light and another receiver can be placed on the projector side for ensuring correct alignment of the tracking device.

It can be appreciated that the projector 4, the processing system 7, the light sensor 8, and/or the imager 9 may include various analog processing devices or computer devices such as a processor, memory, communications link, input/output interfaces such as a network interface, display, keyboard and mouse, and a non-transitory computer-readable medium that may include computer-executable instructions. These instructions may provide for equipment operation, control, calibration, data collection and analysis and other functions deemed relevant by a system designer, owner, user or other such personnel, in addition to the functions described herein.

Elements of the embodiments have been introduced with either the articles "a" or "an." The articles are intended to mean that there are one or more of the elements. The terms "including" and "having" and the like are intended to be inclusive such that there may be additional elements other than the elements listed. The conjunction "or" when used with a list of at least two terms is intended to mean any term or combination of terms. The term "first" and "second" are used to distinguish elements and are not intended to denote a particular order. The term "configured" relates to one or more structural limitations of a device that are required to perform the function or operation for which the device is configured.

The flow diagram depicted herein is just an example. There may be many variations to this diagram or the steps (or operations) described therein without departing from the spirit of the invention. For instance, the steps may be performed in a differing order, or steps may be added, deleted or modified. All of these variations are considered a part of the claimed invention.

The disclosure illustratively disclosed herein may be performed in the absence of any element which is not specifically disclosed herein.

While the disclosure has been described with reference to a preferred embodiment or embodiments, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular embodiment disclosed as the best mode contemplated for carrying out this disclosure, but that the disclosure will include all embodiments falling within the scope of the appended claims.

What is claimed is:

1. An apparatus for displaying a scene using blackbody light, the apparatus comprising:
    a sheet of nano-structures comprising a first side and a second side opposing the first side, the first side being configured to receive light from an environment facing the first side and the second side and emit light to the environment facing the first side and the second side, the second side being configured to receive light from an environment facing the first side and the second side and emit light to the environment facing the first side and the second side, wherein each nano-structure is configured to receive light in a first range of wavelengths resulting in heating the nano-structure and to emit blackbody light corresponding to a range of infrared wavelengths due to the heating to display the scene using the blackbody light;
    a substrate coupled to the first side and/or the second side of the sheet of nano-structures, the substrate being transparent to a selected range of wavelengths, wherein the substrate is coupled to the first side of the sheet of nano-structures, and the substrate is opaque to wavelengths of the emitted blackbody light in order to prevent light leakage from the second side of the sheet of nano-structures to the facing environment of the first side of the sheet of nano-structures;
    a projector configured to irradiate the nano-structures on one of the sides with light in the first range of wavelengths that form the scene to be displayed with the blackbody light emitted from the sheet of nano-structures; and
    an imager configured to detect an image of the displayed scene, wherein the projector is configured to irradiate the first side of the sheet of nano-structures and the imager is configured to image the scene displayed on the second side of the sheet of nano-structures.

2. The apparatus according to claim 1, wherein the scene comprises multiple scenes displayed over time that depict movement.

3. The apparatus according to claim 1, wherein the nano-structures comprise carbon, graphene, layers of carbon, and/or Fullerenes.

4. The apparatus according to claim 3, wherein the nano-structures comprise nano-tubes in single wall and/or multi-wall configurations.

5. The apparatus according to claim 1, further comprising a carrier coupled to the sheet of nano-structures and configured to support the sheet of nano-structures.

6. The apparatus according to claim 5, wherein the sheet of nano-structures comprises four edges and the carrier is coupled to one edge or one edge and an opposing edge.

7. The apparatus according to claim 1, further comprising an imager configured to detect an image of the displayed scene, wherein the projector is configured to irradiate the first side of the sheet of nano-structures and the imager is configured to image the scene displayed on the first side of the sheet of nano-structures.

8. The apparatus according to claim 1, wherein the projector is configured to irradiate the nano-structures in a continuous analog scheme and/or in a pixelated scheme in which unique groups of nano-structures are assigned to pixels and the displayed image is a pixelated image.

9. The apparatus according to claim 1, wherein the first range of wavelengths comprises a visible range of wavelengths and the blackbody light comprises light in a range of infrared wavelengths.

10. The apparatus according to claim 1, further comprising a filter configured to receive the scene displayed with the black body light and to block or reduce intensity of wavelengths of light that are absorbed in an environment that is to be simulated.

11. The apparatus according to claim 1, wherein each of the nano-structures comprises a longitudinal axis or centerline axis and the sheet of nano-structures has the nano-structures with:
 parallel longitudinal axes or centerline axes and the longitudinal axes of centerline axes are perpendicular to a plane of the sheet;
 parallel longitudinal axes or centerline axes and the longitudinal axes of centerline axes are parallel to the plane of the sheet;
 longitudinal axes or centerline axes at a selected angle to the plane of the sheet; and/or
 longitudinal axes or centerline axes at various angles to the plane of the sheet.

12. The apparatus according to claim 1, further comprising a sensor configured to sense an intensity and/or wavelength of the emitted black-body light in order to provide a feedback signal to the projector to irradiate the sheet of nano-structures with light of a wavelength and/or intensity that provides the emitted black-body light to be at a selected intensity and/or wavelength.

13. An apparatus for displaying a scene using blackbody light, the apparatus comprising:
 a sheet of nano-structures comprising a first side and a second side opposing the first side, the first side being configured to receive light from an environment facing the first side and the second side and emit light to the environment facing the first side and the second side, the second side being configured to receive light from an environment facing the first side and the second side and emit light to the environment facing the first side and the second side, wherein each nano-structure is configured to receive light in a first range of wavelengths resulting in heating the nano-structure and to emit blackbody light corresponding to a range of infrared wavelengths due to the heating to display the scene using the blackbody light;
 a substrate coupled to the first side and/or the second side of the sheet of nano-structures, the substrate being transparent to a selected range of wavelengths, wherein the substrate is coupled to the second side of the sheet of nano-structures, and the substrate is opaque to irradiated light in the first range of wavelengths in order to prevent irradiated light leakage from the first side of the sheet of nano-structures to the facing environment of the second side of the sheet of nano-structures;
 a projector configured to irradiate the nano-structures on one of the sides with light in the first range of wavelengths that form the scene to be displayed with the blackbody light emitted from the sheet of nano-structures; and
 an imager configured to detect an image of the displayed scene, wherein the projector is configured to irradiate the first side of the sheet of nano-structures and the imager is configured to image the scene displayed on the second side of the sheet of nano-structures.

14. An apparatus for displaying a scene using blackbody light, the apparatus comprising:
 a sheet of nano-structures comprising a first side and a second side opposing the first side, the first side being configured to receive light from an environment facing the first side and the second side and emit light to the environment facing the first side and the second side, the second side being configured to receive light from an environment facing the first side and the second side and emit light to the environment facing the first side and the second side, wherein each nano-structure is configured to receive light in a first range of wavelengths resulting in heating the nano-structure and to emit blackbody light corresponding to a range of infrared wavelengths due to the heating to display the scene using the blackbody light;
 a projector configured to irradiate the nano-structures on one of the sides with light in the first range of wavelengths that form the scene to be displayed with the blackbody light emitted from the sheet of nano-structures;
 a filter configured to receive the light irradiated by the projector and to block or reduce intensity of wavelengths of that light such that the blackbody light emitted by the screen of nano-structures has a modified intensity that is dependent on the portion of the irradiating light absorbed by the filter; and
 an atmospheric absorption filter configured to simulate atmospheres that contain varying amounts of carbon dioxide, carbon monoxide, and/or water for various latitudes and/or longitudes over the earth, the atmospheric filter being disposed on a side of the sheet of nano-structures for receiving the emitted blackbody light.

15. The apparatus according to claim 14, wherein the projector is further configured to irradiate the nano-structures according to an algorithm that shifts a blackbody emissions shape as a function of temperature in order for the emission of blackbody light to display the scene blocks or lowers an intensity of wavelengths of light that are absorbed in an environment that is to be simulated.

* * * * *